United States Patent [19]
Altschuler et al.

[11] Patent Number: 5,812,430
[45] Date of Patent: Sep. 22, 1998

[54] COMPONENTIZED DIGITAL SIGNAL PROCESSING

[75] Inventors: Steven J. Altschuler, Redmond; William E. Kim, Seattle; Lani F. Wu, Redmond, all of Wash.

[73] Assignee: Microsoft Corporation, Redmond, Wash.

[21] Appl. No.: 867,086

[22] Filed: Jun. 2, 1997

[51] Int. Cl.[6] .................................. G06F 3/00; G06F 5/00
[52] U.S. Cl. .................... 364/572; 364/574; 364/724.11; 364/280.5; 395/701; 395/709
[58] Field of Search .................................. 364/572, 574, 364/571.07, 571.08, 724.11, 724.17, 724.1, 280.4, 280.5; 395/701, 702, 709, 708; 375/242, 244

[56] References Cited

U.S. PATENT DOCUMENTS

| | | | |
|---|---|---|---|
| 4,868,773 | 9/1989 | Coyle et al. | 364/724.014 |
| 5,175,856 | 12/1992 | Van Dyke et al. | 395/709 |
| 5,313,614 | 5/1994 | Goettelmann et al. | 395/705 |
| 5,369,606 | 11/1994 | Hessel | 364/724.16 |
| 5,541,864 | 7/1996 | Van Bavel et al. | 364/724.1 |
| 5,613,117 | 3/1997 | Davidson et al. | 395/708 |

*Primary Examiner*—James P. Trammell
*Assistant Examiner*—Bryan Bui
*Attorney, Agent, or Firm*—Christensen O'Connor Johnson & Kindness PLLC

[57] ABSTRACT

A method, system and computer product for allowing efficient user interaction with digital time-based signals. User control and filter information (symbolic, procedural or a combination of both) are optimized for greatly improving calculating efficiency. First, filters are symbolically optimized. Then, a single optimized procedure is generated and compiled into an optimized procedure code. The procedure code then processes the input signal according to control information.

12 Claims, 4 Drawing Sheets

COMPONENTIZED DIGITAL SIGNAL PROCESSING

FIELD OF THE INVENTION

This invention relates to methods, apparatus, and computer product for digital signal processing and, more particularly, methods, apparatus, and computer product for efficiently filtering received digital signals.

BACKGROUND OF THE INVENTION

While, as will be understood from the following description, the present invention was developed for efficiently and effectively processing time-based digital signals. This invention may also find utility in other environments.

Hyper-text markup language (HTML) is a worldwide web (www) format that allows for the presentation of a variety of media, such as audio, animation, and video. However, HTML does not include ways to modify the behavior of these media. HTML is a very good way of describing static documents, but has no efficient way of describing interactive behavior. Java® has provided the ability to manipulate objects described in HTML. Although Java can be used to manipulate graphical objects in text with a great deal of control, it is ineffective with regard to the manipulation of time-based signals, i.e., audio and video signals. In Java one can change properties such as timbre or pitch provided that an object is written that can be controlled through Java. Java fails to provide any easy way of accessing low level or procedure code. No standard by which time-based media can be manipulated is presently available.

There are systems that can be used to manipulate time-based signals. These systems include multiple digital signal processing filters responsible for processing input digital signals. Generally, in systems having a separate DSP, the filter's signal processing algorithm runs on the DSP, while most of the other control code runs on the CPU. This requires the CPU to constantly supervise and feed data to the DSP This process is extremely inefficient, which leads to the CPU and/or DSP to stall unnecessarily while it waits to receive or send commands to the other processor.

Accordingly, there is a need for a manipulatable digital signal processing system that allows efficient and effective interaction between processor and process-boundaries for the manipulation of time-based digital signals. The present invention is directed to providing such a digital signal processing system.

SUMMARY OF THE INVENTION

In accordance with this invention a method, system and computer product for generating optimized computer code for minimizing digital signal filter processing of time-based digital signals using predefined and user-definable filters. Filters can include symbolic information, procedural information or both. A filter is defined as a low level filter if it only includes procedural information, filters that include only symbolic information or that include both procedural and symbolic information are defined as a high level filters. The method includes generating symbolic information for filters defined solely by procedural information, if both low and high level filters are present. Then, a simplified equation of the relationship between filters based on generated or predefined symbolic information is produced. Next, procedural information is retrieved for all high level filters that include both symbolic and procedural information. Procedural information is determined for all high level filters that include only symbolic information according to prestored digital filters and a predetermined threshold. Next, an optimized single filtering procedure is developed. The optimized single filtering procedure is based on the retrieved or determined procedural information of the high level filters or the procedural information, if all the filters are determined as being low level filters. Finally, computer code for minimizing digital signal filter processing of time-based digital signals based on the optimized single filter procedure is generated.

In accordance with other aspects of the present invention, the step of determining procedural information for all abstract filters is based upon prestored digital filters and an error function which compares the symbolic information of the high level filters with the prestored digital filters. High level filters that contain only symbolic information are defined to be abstract. Then by determining the filter with the lowest associated error value, the appropriate procedural information is extracted. If no filter is found with an acceptable error value, the abstract filter is decomposed and the process described above is recursively applied. If after all of the constituent filters have been analyzed and none has an acceptable matching prestored filter, the filter is replaced with a default filter or an error is raised.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
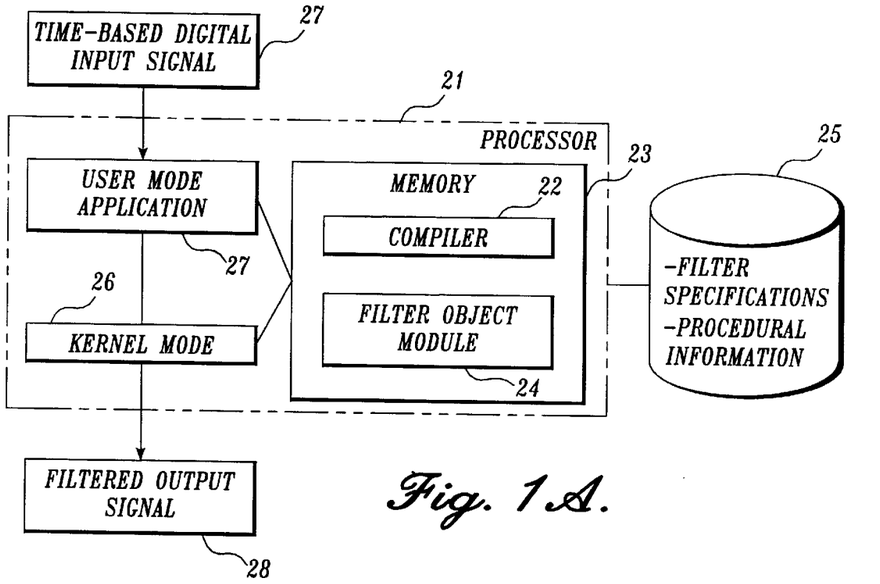
FIGS. 1A, 1B and 2 are block diagrams different embodiments of the present invention.

As will be better understood from the following description, the present invention is directed to a method, system and computer product for allowing a computer to efficiently interact with digital time-based signals. As shown in FIG. 1A, an application running in a user mode process 20 within a processor 21 uses a compiler 22 stored in processor memory 23 to create a signal or filter object module 24 (platform specific code) according to predefined filter specifications and/or filter procedure information stored in an external database 25. The filter object module 24 is also stored in processor memory 23. A kernel model process 26 within the processor 22 executes the filter object module 24 to efficiently filter a time-based digital input signal 27, thus generating a filtered output signal 28. Therefore, the kernel mode process 26 independently generates the filtered output signal 28 from the input signal 27 without extensive data exchange from the application running in the user mode process 20.

This implementation provides efficient streaming for processing an input signal by reducing multiple transfers of data and control information to a single command. By compiling a series of instructions into the filter object module 24 for use by the kernel mode process 26, data and control transfers are minimized by limiting the exchange to a single asynchronous command. Normally, an application running at the user mode 20 processes the input signal 27 by invoking a kernel mode process through a system call. This involves setting up data and control paths between the user and kernel mode processes 20 and 26, passing control information and data to the kernel mode process 26, and waiting for the system call to return to the application.

Figure 1B:
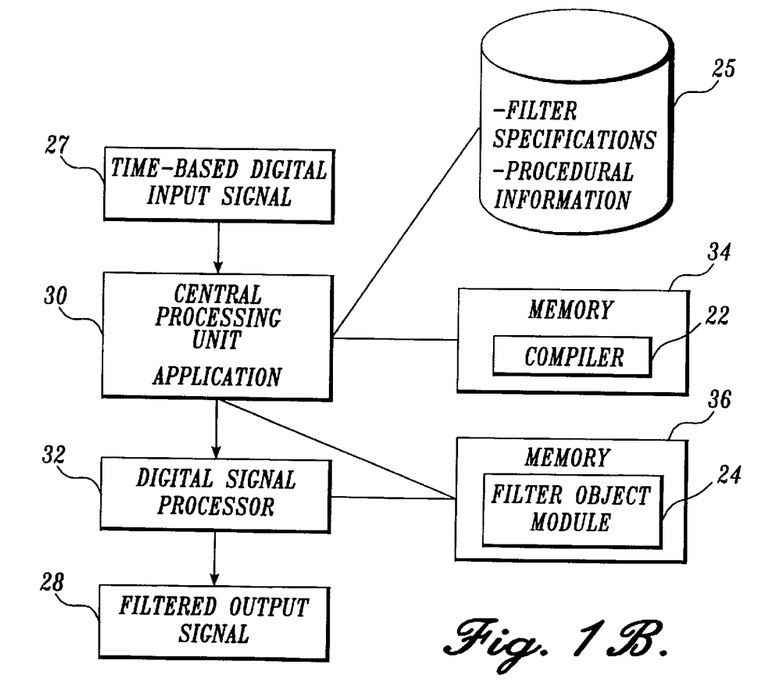

As shown in FIG. 1B, with separate processors (a central processing unit 30 (hereinafter CPU) and a digital signal processor 32 (hereinafter DSP)) the transfer of data and control is similarly minimized. The CPU 30 uses a compiler 22 stored in processor memory 34 to create the filter object module 24 according to predefined filter specifications and/or filter procedure information stored in an external database 25. The filter object module 24 is stored in DSP memory 36. The DSP 32 accesses the filter object module 24 to generate the filtered output signal 28 from the input signal 27 according to a single asynchronous command from the CPU 30. The filtering process and the generation of filter object module 24 is described in more detail below with respect to FIGS. 4–6.

Figure 2:
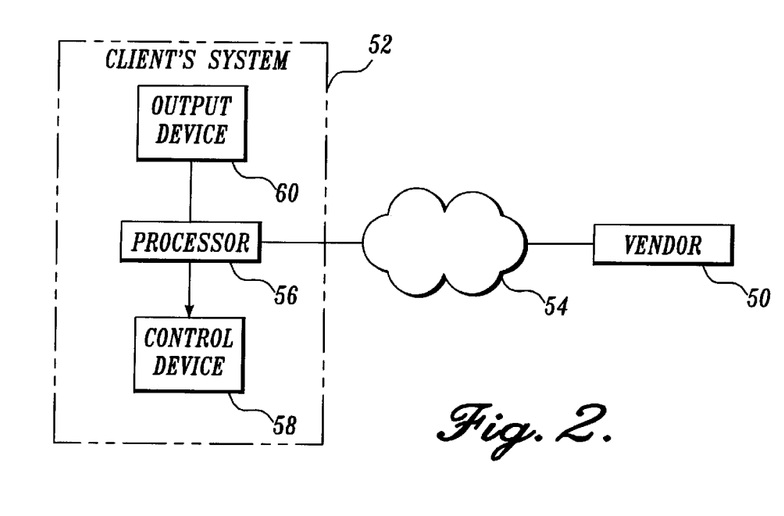

FIG. 2 illustrates an example of a system that implements the features of the present invention. A vendor server 50 connects to a client computer system 52 across a public or private data network 54. In this example, vendor 50 supplies digital time-based signals, such as audio, video or both, to the client computer system 52 over the network 54. A processor(s) 56 within the client computer system 52 receives the digital time-based signals. The client computer system 52 also includes a control device 58 and at least one output device 60; both connect to the processor 56. The control device 58 provides control information to the processor 56, thus allowing a user to manipulate the received digital time-based signals. The processor 56 filters the digital time-based signals according to predefined digital filters and the control information. Since the digital time-based signals may be either video, audio or something similar, the output device 60 is a video display device, audio speakers, or any other type of output device capable of outputting the processed digital time-based signals. As will be readily appreciated by those of ordinary skill in the art of digital signal processing, the methods of the present invention may be applied to various computer systems and therefore is not limited to the configurations shown in FIGS. 1A, 1B and 2.

Typically, a DSP includes multiple digital filters, such as low-, high-, and band-pass filters, possibly produced by different DSP suppliers. For example, the DSP may include a finite impulse response (FIR) filter. The FIR filter may be used for image or video transformations using Sobel operators, low-, high-, or band-pass filtering or audio special effects such as reverb. Also, black box filters may be used for filtering digital signals without describing the detailed internal workings of the filter. Examples of black box filters include video file readers, sinks to outputs and envelope readers for wave table synthesizers. In order for black box filters to operate with the present invention, black box filters must be described at some abstract level to allow interaction with other filters. Black box filters do not need to be described at a non-abstract or low level of operation.

The DSP may also perform high level operations using various math transformation functions, such as Sample rate converters (SRC), linear transforms (LT) and fast fourier transforms (FFT). An SRC may be used for file format conversion, synchronization or pitch shifting. An LT can be implemented as a signal mixer, a splitter, a scalar volume or an intensity control. An FFT provides for signal representation transformation. These functions are abstractly described or stored for interaction with abstract information of filters.

Digital filter information provides the present invention with information important for the optimization of the digital filters. For the purposes of this invention, non-abstract (procedural) information, abstract (symbolic) information or both identify each of the digital filters. This information is compiled by the filter producer from predefined specifications into a filter object module. The object module is an object instantiated from a class called filter that includes general data and procedures required for describing a filter for the purpose of the present invention. These descriptions are implemented in an object oriented programming environment.

Preferably, the procedural information is p-code compiled from instructions on how to effect filter response. The procedural information may include pulse code modulation (amplitude v. time) or compressed digital signal definitions. Examples of compressed digital signal definitions may be a stored look-up table (LUT) or may be a frequency range of a filter divided into frequency bands, wherein a different number of bits are assigned to each band depending upon expected types of input signals or desired output.

Figure 3:
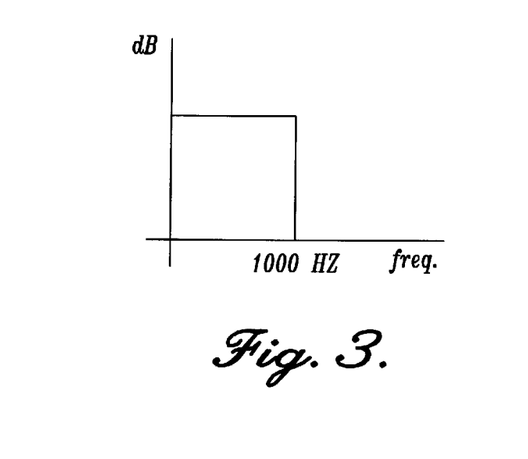
FIG. 3 is a graphical representation of a filter that is functional in the present invention.

Symbolic information of a filter is essentially an abstract or symbolic representation of the filter. The symbolic information of each filter includes basic associated properties for allowing optimization to occur. The properties are separated into four categories; Resource (e.g. memory, processor, bus bandwidth), Data (e.g. memory mapped, PIO, bus operation), Transform (e.g. Fourier, Laplace, time descriptions) and Algebra (e.g. inverse functions). FIG. 3 illustrates an example of an ideal 1,000 Hz low-pass filter which can be easily defined in a symbolic manner using transform properties. In another example, the ALGEBRAIC_PROPERTIES (within the category algebra) for an OP_SCALAR_MULTIPLY could be defined as the following:

---

PROPERTY{OP_SCALAR_MULTIPLY,ALGEBRAIC_PROPERTIES)=
    {AP_COMMUNITIVE = TRUE,
    AP_ASSOCIATIVE = TRUE,
    AP_INVERSE = OP_SCALAR_DIVISION,
    AP_IDENTITY = 1
    AP_ZERO = 0}

---

The example above defines the scalar multiplication operator as an operator that is communitive and associative, has scalar division as an inverse operator, is the identity operator when one of its inputs is 1, and is the zero constant when one of inputs is 0.

Figure 4:
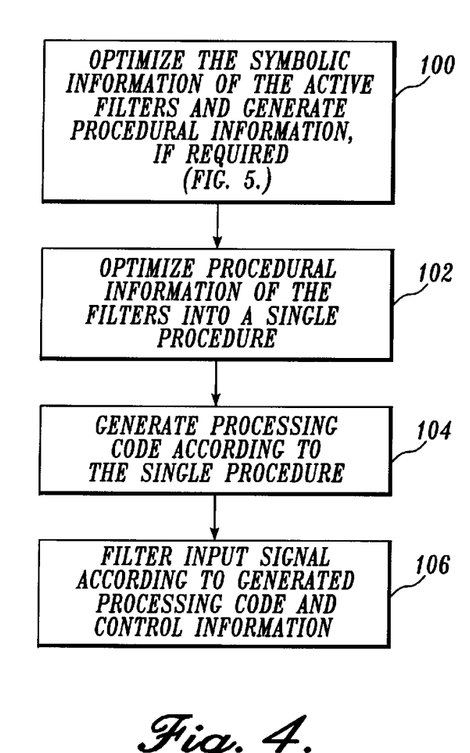
FIGS. 4–6 are flow diagrams illustrating the method of the present invention.
Figure 5:
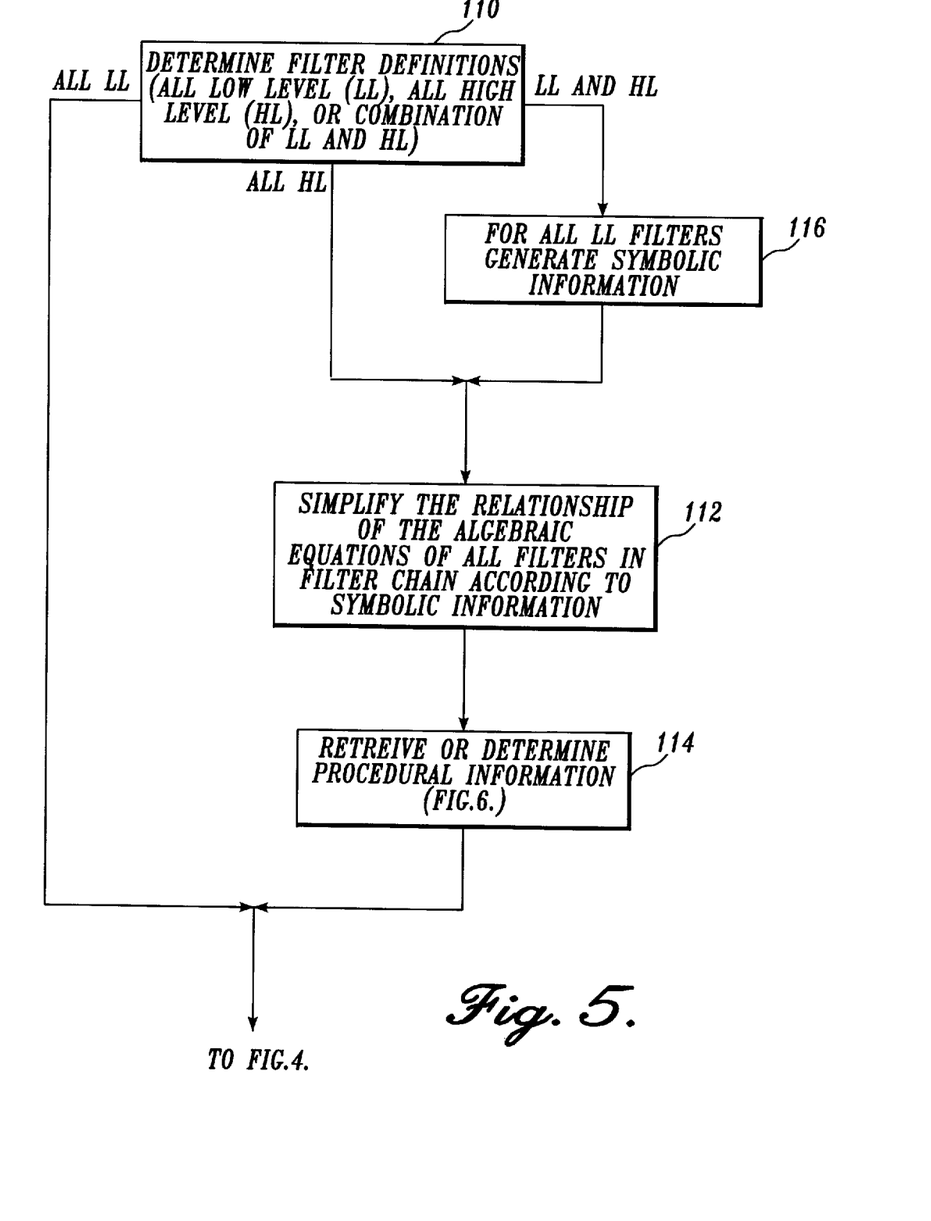
Figure 6:
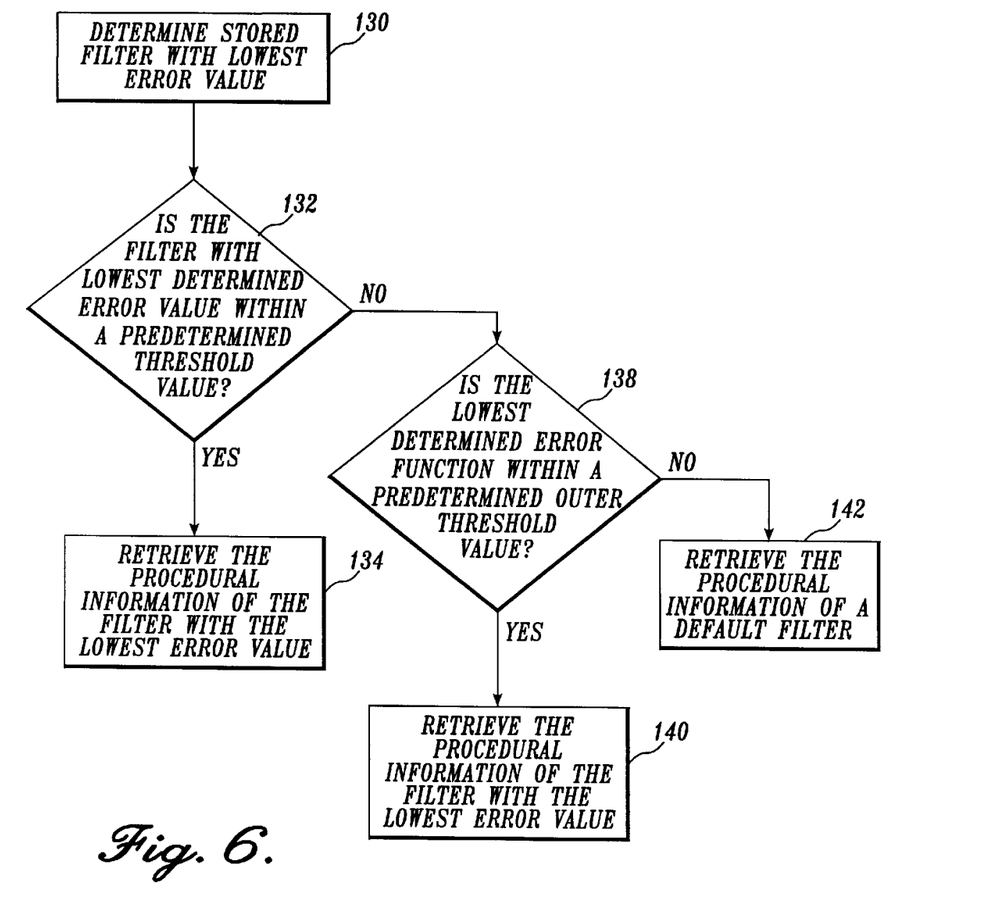

In accordance with the invention multiple filters defined in an abstract manner are combined to create an optimized filter. The optimized filter minimizes digital signal filter processing time when compared to the processing time of the multiple filters whose attributes are combined to create the optimized filter. The method of the present invention described in FIGS. 4–6 present a method that operates on the symbolic information of DSP filters until optimization is complete. After optimization the procedural information is retrieved or generated which is then used for filtering of the input digital signal.

FIG. 4 illustrates a method for minimizing digital signal filter processing of time-based digital signals according to the present invention. Optimized filter information is created from predefined filter information described above. Control information is then applied to the optimized filter information. The control information may be a simple user change of the output level of a frequency band, such as a volume control of a frequency band, or may be generated from a specific action performed by an object in a video game. A filter is a high level filter if it includes symbolic information and is a low level if it only includes procedural information. First, the symbolic information of the digital filters are optimized and procedural information is retrieved or generated (if required), at block 100. This step is described in more detail below with respect to FIG. 5. Next, all the procedural information is optimized into a single procedure, at block 102. Processing code is then generated from the single procedure, at block 104. Last, the input digital signal is filtered according to the generated processing code and any control information, at block 106. Steps 100–104 are performed within the user mode process 27 and step 106 is performed within the kernel mode process 26 of the processor 21.

FIG. 5 illustrates the process performed in block 100 of FIG. 4. First at block 110, the definitions of the active digital filters are determined. An active digital filter is a filter that is activated operating on input digital signals. The step in block 110 results in three situations: all the digital filters are low level filters; all digital filters are high level filters; the digital filters include a combination of low and high level filters. If all of the digital filters are low level filters, the procedural information is sent directly to the procedural information optimization step.

If all of the digital filters are high level filters, the algebraic relationship of the filters is first simplified, see block 112. For example, the filtering function g(a)*h(g(b)) *g(c) is determined from a predefined setup for processing signals a–c through filters g and h. If the functions, g(x) and h(x), include properties indicating that g(x)*g(y)=g(x*y) and h(g(x))=g(h(x)) (x and y are signals), the filtering function is simplified to g(a*c*h(b)). This not only reduces the number of calls to g(), but also allows the function itself to be described with the single property set defined for g(). This simplified function can be used for further optimization if this function is combined with other functions. As can be readily appreciated to those of ordinary skill in the art, the algebraic relationships for simplification depend upon the type of signals being filtered, the filters available, etc. and can be easily changed according to system requirements. The present invention uses a symbolic stage that is similar in functionality to mathematics program, such as Maple, Mathematica or MACSYMA, for performing high-speed simplification of algebraic relationships of the filters present in a DSP using the properties associated with each filter. At block 114, the procedural information of each filter is retrieved or determined, if no procedural information exists. This step is described in more detail below with respect to FIG. 6.

If, at block 110, it is determined that low level and high level filters are present, symbolic information is generated for all of the low level filters, see block 116. Now all the filters include symbolic information which then can be processed through the steps in blocks 112 and 114.

Once all the filters include procedural information from the results of block 110 and blocks 114, the procedural information for each of the filters is optimized into a single procedure (block 102, FIG. 4). This optimization step is performed similar to that of the step described in block 112, wherein a program like the examples described above can be implemented to perform the optimization of the procedural information of the filters into a simpler form.

FIG. 6 illustrates the method performed in block 114 of FIG. 5. First, at block 130, an error value is generated according to the symbolic information of a digital filter and each filter of a set of predefined filters. The procedural information of the digital filter with the lowest associated error value is retrieved provided, the error value is within a predetermined threshold, see blocks 132 and 134. However, if no filter is found within the predetermined threshold, the filter's constituent components are examined to see if an appropriate match can be made and the process described in FIG. 6 is recursively applied to all constituent parts until the filter is completely defined. If at any point in this process, all error functions are outside the predetermined threshold, the procedural information of a predefined default filter is retrieved, see block 142 or an appropriate error condition is raised.

The benefit of defining functions in this manner is that one can specify the ideal properties of individual components to define the ideal properties of the entire system without having to be concerned with the possibility of accumulating errors associated with approximating these properties. In addition, it is not necessary to implement commonly used signal processing components.

All of the examples below demonstrate the ability to make very significant optimizations on a client computer without the need for much sophistication in the compiler technology or a great deal of computational power (the term function below can be interchanged with filter, signal transformation or signal operation). The ability to make these optimizations are predicated upon the registration of algebraic and data transfer properties of the signal processing code.

Procedural Property Derivation

In the example below a "for" statement introduces uncertainty to what the overall property of Average() is.

```
Code without symbolic information:
int Average(int array[], int elements)
{
int    acc,i;
       for (i=acc=0;i<elements;i++) acc+=*array++;
       return acc/elements;
}
```

A compiler fails to understand that the operation after the "for" statement is a summation. So though the above example would work in the present invention, it is treated as a blackbox function and performs optimization only up to that point. Another function called Summation() is also defined. Summation() takes a vector and returns the sum of all its elements.

```
Code with symbolic information:
int Summation(int array[], int elements)
   @ property(ALGEBRAIC_PROPERTIES) = STD_LINEAR,
     property(IMPULSE) = -elements
{
  int acc,i;
  for (i=acc=0;i<elements;i++) acc+=*array++;
  return acc;
}
Inheritance of symbolic information:
int Average(int array[], int elements)
{
  return Summation(array, elements)/acc;
}
```

It this example the compiler can derive from simple rules that the function, Average(), has the same properties as the Summation().

The following example demonstrates another feature of the present invention which is the "iterate" construct which allows a function to iterate over a set of samples without having to deal with the specifics of a given signal format.

```
Construct for abstract data transfers:
Sound
PoorLPFilter(Sound sound)
{
   iterate(n, SAMPLE, sound) {
      sound[n] = Average(&sound[n], 3);
   }
   return sound;
}
```

The Sound type is not a simple scalar data type such as int or float, but instead is a type of object which is derived from the type, Signal. Objects of type Signal have properties which define the number of dimensions, whether it is defined continuously or discretely, the precision of its values, the range and domain of the signal, and the sample rate. A Sound object is just a specific one-dimensional Signal.

A Signal object defines what type of signal is being processed, and allows signals to be passed from one function to another but it does not specify how the data is to be passed around. In the example above passed samples are iterated and modified. This code would not work if received sound was continuously defined.

```
A specific data transfer property:
Sound
PoorLPFilter(Sound sound@property(DATA)={TYPE=BUFFER})
```

The parameter, sound above, is now constrained so that the function only accepts sounds whose data are stored and retrieved through a buffer. The benefit of this is that the optimization takes advantage of not only the properties of the function but also the properties of the data passed between. For example if the filter defined by this function was to be cascaded in order to achieve a sharper cutoff, the code looks something like this:

sound=PoorLPFilter(PoorLPFilter(sound));

With the registered algebraic properties the functions can be combined to some extent to get the following:

```
iterate(n, SAMPLE, sound) {
sound[n] Average(&sound[n], 3);
}
iterate(n, SAMPLE, sound) {
   sound[n] = Average(&sound[n], 3);
}
```

Because the result of the second iteration is dependent on the first it may first appear that there can be no further optimizations made. However, the second iteration does not require the total completion of the first iteration in order to get valid data. In fact, the second iteration can start after the first iteration has processed 3 elements. So the code is simplified into the following:

```
iterate(n, SAMPLE, sound) {
   sound[n] = Average(&sound[n], 3),
   delay(3, SAMPLE) sound[n] = Average(&sound[n], 3);
}
```

This optimization is possible because the impulse of the Summation() function was registered as "impulse=−elements" which indicates the function is anti-causal and has a impulse response that extends by −elements into the past. This optimization eliminates the overhead associated with the second iteration statement. Optimization is possible but would require a great deal of sophistication in the compiler. However, the filter function can be written like this:

```
Sound
PoorLPFilter(Sound sound)
{
   sound = convolve(sound, {1,1,1}/3);
   return sound;
}
```

This makes the cascaded filter code look like the following:

sound=convolve(convolve(sound, {1,1,1}/3), {1,1,1}/3);

This is not very optimized, but with the algebraic property of convolve(), x*y*z=x*(y*z) (*=the convolve operation), the above statement is procedurally optimized to:

sound=convole(sound, {1,2,3,2,1}/9);

Symbolic Property Optimization and Procedural Information Retrieval

There are higher-level properties, such as frequency/phase response and spectrum, that allow for even more optimizations. For example a filter function like the following is provided:

```
Sound
LPFilter(Sound sound)
   @ property(FREQUENCY_RESPONSE) =
   {BAND = {1000hz,64000hz,-100db)}
```

The frequency response of this function is −100 db between 1 khz and 64 khz. If the property of the sound passed in is 48 kHz 16-bit PCM audio, then the filter essentially allows zero signal above 1 khz since the maximum signal is 96 dB. Assuming no other properties had been registered for frequency or phase, the following expression:

sound=LPFilter(LPFilter(sound));

is simplified to:

sound=LPFilter(sound);

Of course in most cases the frequency response registered for the filter would only approximate the actual response of the filter. Depending on the actual frequency response of the filter, this optimization could be a very good or very poor approximation of the cascaded filter.

As signal processing components of this type are cascaded, the error between actual and registered properties will accumulate. For very complex systems. the accumulated error of the system can be very significant. Therefore, functions are defined completely through their properties. For example:

```
abstract Sound
LPFilter(Sound sound)
   @ property(FREQUENCY_RESPONSE) =
   {BAND=1000hz,64000hz,-100db)};
abstract Sound
HPFilter(Sound sound)
```

```
            @ property(FREQUENCY_RESPONSE) =
               {BAND={0hz,500hz,-100db)};
```

These define two abstract functions with their respective frequency responses. Cascading these filters result in a function that shares the properties of both of them. So the following expression:

```
            LPFilter(HPFilter(sound))
            has the following properties:
            @ property(FREQUENCY_RESPONSE)
               = {BAND={1000hz,64000hz,-100db),
               BAND = {0hz,500hz,-100db)};
```

The benefit of defining functions in this manner is that one can specify the ideal properties of individual components to define the ideal properties of the entire system without having to be concerned with the possibility of accumulating errors associated with approximating these properties. In addition, it is not necessary to implement commonly used signal processing components.

Specifying, the systems in this manner is convenient but one cannot execute these abstract specifications. One way these specifications are turned into executable code is by performing a top-down search for non-abstract components that best match the property specifications. (The process described above and in FIG. 6)

The expression above specifies an ideal bandpass filter that passes frequency components between 500 and 1000 hz. If a non-abstract bandpass filter was found that matched these characteristics then that filter is used to implement the bandpass filter. If a bandpass was not found with these properties, then the search continues downward to its constituent filters: a 1000 hz highpass and a 500 hz lowpass. If none of the constituent filters are found, a default filter is used.

The chances of finding a match based on matching constant values of properties is negligible unless the client's machine has access to thousands of similar filters. To increase the likelihood that a match is found, the language allows properties of non-abstract functions to be specified as a function of one or more of its parameters or other properties. For example, the following is the header for a non-abstract function that is a variable pass filter:

```
            Sound
            GeneralLPFilter(Sound sound, Frequency cutoff)
               @ property(FREQUENCY_RESPONSE) ={BAND={0,cutoff,-100db)}
```

By parameterizing the properties in this manner, the client's language compiler is able to "create" a match by comparing normalized (instead of absolute) properties against each other. Note that this example bandpass filter is defined explicitly as two cascaded abstract filters. This simplified the search for the constituent functions that can be used to build this filter.

As can be appreciated to those of ordinary skill in the computer arts, the present invention is efficiently implemented with a compiler, however, could operate with a virtual machine, similar to a Java virtual machine, which translates system independent code into system specific code. Compiling is used because of its obvious processing speed advantages.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating optimized computer code for minimizing digital signal filter processing of time-based digital signals using predefined filters, said method comprising the steps of:

generating symbolic information for filters determined to have only procedural information, if low and high level filters are present, wherein filters are low level filters if they only include procedural information;

generating a simplified equation of the relationship between filters based on generated or predefined symbolic information;

retrieving procedural information for all high level filters with symbolic and procedural information;

determining procedural information for all high level filters with symbolic information and without procedural information based upon prestored digital filters and a predetermined threshold;

generating an optimized single filtering procedure from the retrieved or determined procedural information of the high level filters;

generating an optimized single filtering procedure, if all the filters are determined as being low level filters; and generating computer code for minimizing digital signal filter processing of time-based digital signals based on the generated optimized single filtering procedure.

2. The method of claim 1, wherein the step of determining procedural information for all high level filters with symbolic information and without procedural information based upon prestored digital filters and a predetermined threshold further comprises:

comparing the symbolic information of the high level filters with the at least one prestored digital filters;

determining an error value for each comparison;

retrieving the procedural information of the stored digital filter with the lowest associated error value, if the error value is within a first threshold value;

retrieving the procedural information of at least one stored digital filter with the lowest associated error value, if the error value is not within the first threshold value and is within a second threshold value; and retrieving the procedural information of a default digital filter, if the error value is not within the first or second threshold value.

3. A system for generating optimized computer code for minimizing digital signal filter processing of time-based digital signals using predefined filters, said system comprising:

a means for generating symbolic information of filters determined to have only procedural information, if low and high level filters are present, wherein filters are low level filters if they only include procedural information;

a means for generating a simplified equation of the relationship between filters based on generated or predefined symbolic information;

a means for retrieving procedural information for all high level filters with symbolic and procedural information;

a means for determining procedural information for all high level filters with symbolic information and without procedural information based upon prestored digital filters and a predetermined threshold;

a means for generating an optimized single filtering procedure from the retrieved or determined procedural information of the high level filters;

a means for generating an optimized single filtering procedure, if all the filters are determined as being low level filters; and a means for generating computer code for minimizing digital signal filter processing of time-based digital signals based on the generated optimized single filtering procedure.

4. The system of claim 3, wherein the means of determining procedural information for all high level filters with symbolic information and without procedural information based upon prestored digital filters and a predetermined threshold further comprises:

a means for comparing the symbolic information of the high level filters with the prestored digital filters;

a means for determining an error value for each comparison;

a means for retrieving the procedural information of the stored digital filter with the lowest associated error value, if the error value is within a first threshold value;

a means for retrieving the procedural information of at least one stored digital filter with the lowest associated error value, if the error value is not within the first threshold value and is within a second threshold value; and a means for retrieving the procedural information of a default digital filter, if the error value is not within the first or second threshold value.

5. A program storage device readable by a machine, tangibly embodying a program of instructions executable by a machine to perform method steps for generating optimized computer code for minimizing digital signal filter processing of time-based digital signals using predefined filters, said method steps comprising:

generating symbolic information of filters determined to have only procedural information, if low and high level filters are present, wherein filters are low level filters if they only include procedural information;

generating a simplified equation of the relationship between filters based on generated or predefined symbolic information;

retrieving procedural information for all high level filters with symbolic and procedural information;

determining procedural information for all high level filters with symbolic information and without procedural information based upon prestored digital filters and a predetermined threshold;

generating an optimized single filtering procedure from the retrieved or determined procedural information of the high level filters;

generating an optimized single filtering procedure, if all the filters are determined as being low level filters; and generating computer code for minimizing digital signal filter processing of time-based digital signals based on the generated optimized single filtering procedure.

6. The method of claim 5, wherein the step of determining procedural information for all high level filters with symbolic information and without procedural information based upon prestored digital filters and a predetermined threshold further comprises:

comparing the symbolic information of the high level filters with the prestored digital filters;

determining an error value for each comparison;

retrieving the procedural information of the stored digital filter with the lowest associated error value, if the error value is within a first threshold value;

retrieving the procedural information of at least one stored digital filter with the lowest associated error value, if the error value is not within the first threshold value and is within a second threshold value; and retrieving the procedural information of a default digital filter, if the error value is not within the first or second threshold value.

7. A computer program product included in a computer readable medium for generating optimized computer code for minimizing digital signal filter processing of time-based digital signals using predefined filters, said computer program product comprising:

a means for generating symbolic information of filters determined to have only procedural information, if low and high level filters are present, wherein filters are low level filter, if they only include procedural information;

a means for generating a simplified equation of the relationship between filters based on generated or predefined symbolic information;

a means for retrieving procedural information for all high level filters with symbolic and procedural information;

a means for determining procedural information for all high level filters with symbolic information and without procedural information based upon prestored digital filters and a predetermined threshold;

a means for generating an optimized single filtering procedure from the retrieved or determined procedural information of the high level filters;

a means for generating an optimized single filtering procedure, if all the filters are determined as being low level filters; and a means for generating computer code for minimizing digital signal filter processing of time-based digital signals based on the generated optimized single filtering procedure.

8. The computer program product of claim 7, wherein the step of determining procedural information for all high level filters with symbolic information and without procedural information based upon prestored digital filters and a predetermined threshold further comprises:

comparing the symbolic information of the high level filters with the prestored digital filters;

determining an error value for each comparison;

retrieving the procedural information of the stored digital filter with the lowest associated error value, if the error value is within a first threshold value;

retrieving the procedural information of at least one stored digital filter with the lowest associated error value, if the error value is not within the first threshold value and is within a second threshold value; and retrieving the procedural information of a default digital filter, if the error value is not within the first or second threshold value.

9. A method for minimizing the digital signal filter processing of timebased digital signals, said method comprising the steps of:

receiving at least one time-based input signal;

determining the types of digital signal filters present for processing the at least one time-based input signal based on the types of information associated with each digital filter;

generating optimized computer code for minimizing digital signal filter processing of time-based digital signals using predefined filters, said generating step comprising the steps of:

generating symbolic information of filters determined to have only procedural information, if low and high level filters are present, wherein filters are low level filters if they only include procedural information;

generating a simplified equation of the relationship between filters based on generated or predefined symbolic information;

retrieving procedural information for all high level filters with symbolic and procedural information;

determining procedural information for all high level filters with symbolic information and without procedural information based upon prestored digital filters and a predetermined threshold;

generating an optimized single filtering procedure from the retrieved or determined procedural information of the high level filters;

generating an optimized single filtering procedure, if all the filters are determined as being low level filters; and     generating computer code for minimizing digital signal filter processing of time-based digital signals based on the generated optimized single filtering procedure;

determining if a signal control input has been applied to the at least one received input signal; and filtering the at least one received input signal based on the generated computer code and determined signal control input.

10. The method of claim 9, wherein the step of determining procedural information for all high level filters with symbolic information and without procedural information based upon prestored digital filters and a predetermined threshold further comprises the steps of:

comparing the symbolic information of the high level filters with the prestored digital filters;

determining an error value for each comparison;

retrieving the procedural information of the stored digital filter with the lowest associated error value, if the error value is within a first threshold value;

retrieving the procedural information of at least one stored digital filter with the lowest associated error value, if the error value is not within the first threshold value and is within a second threshold value; and     retrieving the procedural information of a default digital filter, if the error value is not within the first or second threshold value.

11. A system for minimizing the digital signal filter processing of time-based digital signals, said system comprising:

a receiving means for receiving a time-based input signal;

a generator for generating optimized computer code for minimizing digital signal filter processing of time-based digital signals using predefined filters, said system comprising:

a means for generating symbolic information of filters determined to have only procedural information, if low and high level filters are present, wherein filters are low level filters if they only include procedural information;

a means for generating a simplified equation of the relationship between filters based on generated or predefined symbolic information;

a means for retrieving procedural information for all high level filters with symbolic and procedural information;

a means for determining procedural information for all high level filters with symbolic information and without procedural information based upon prestored digital filters and a predetermined threshold;

a means for generating an optimized single filtering procedure from the retrieved or determined procedural information of the high level filters;

a means for generating an optimized single filtering procedure, if all the filters are determined as being low level filters; and     a means for generating computer code for minimizing digital signal filter processing of time-based digital signals based on the generated optimized single filtering procedure;

a means for determining if a signal control input has been applied to the at least one received input signal; and a means for filtering the at least one received input signal based on the generated computer code and determined signal control input.

12. The system of claim 11, wherein the means of determining procedural information for all high level filters with symbolic information and without procedural information based upon prestored digital filters and a predetermined threshold further comprises:

a means for comparing the symbolic information of the high level filters with the prestored digital filters;

a means for determining an error value for each comparison;

a means for retrieving the procedural information of the stored digital filter with the lowest associated error value, if the error value is within a first threshold value;

a means for retrieving the procedural information of at least one stored digital filter with the lowest associated error value, if the error value is not within the first threshold value and is within a second threshold value; and     a means for retrieving the procedural information of a default digital filter, if the error value is not within the first or second threshold value.

\* \* \* \* \*

UNITED STATES PATENT AND TRADEMARK OFFICE
CERTIFICATE OF CORRECTION

PATENT NO. : 5,812,430                           Page 1 of 4
DATED : September 22, 1998
INVENTOR(S) : S.J. Altschuler et al.

It is certified that error appears in the above-indentified patent and that said Letters Patent is hereby corrected as shown below:

| COLUMN | LINE | |
|---|---|---|
| 1 | 14-15 | "signals. This" should read --signals, this-- |
| 1 | 34 | after "processing" insert --(DSP)-- |
| 1 | 39 | after "DSP" insert --. -- |
| 1 | 39 | after "leads" delete "to" |
| 1 | 54 | after "filters" insert --are provided-- |
| 1 | 57 | "information," should read --information;-- |
| 2 | 5 | after "filters" insert --,-- |
| 2 | 7-8 | "as being" should read --to be-- |
| 2 | 33 | after "diagrams" insert --of-- |
| 4 | 49 | after "one of" insert --its-- |
| 4 | 56 | "present" should read --presents-- |
| 4 | 58 | after "optimization" (second occurrence) insert --,-- |
| 4 | 59 | "which is" should read --and-- |
| 4 | 64 | after "from" insert --the-- |
| 5 | 4 | after "low level" insert --filter-- |
| 5 | 5 | "are" should read --is-- |

UNITED STATES PATENT AND TRADEMARK OFFICE
CERTIFICATE OF CORRECTION

PATENT NO.   : 5,812,430
DATED        : September 22, 1998
INVENTOR(S)  : S.J. Altschuler et al.

It is certified that error appears in the above-indentified patent and that said Letters Patent is hereby corrected as shown below:

| COLUMN | LINE | |
|---|---|---|
| 5 | 31-32 | ", g(x) and h(x)," should read --g(x) and h(x)-- |
| 5 | 40 | "appreciated to" should read --appreciated by-- |
| 5 | 45 | after "to" insert --a-- |
| 5 | 62 | "similar" should read --similarly-- |
| 6 | 1-2 | "and each filter of" should read --and of each filter in-- |
| 6 | 4 | after "provided" delete --,-- |
| 6 | 5 | "threshold," should read --threshold;-- |
| 6 | 13 | after "142" insert --,-- |
| 6 | 65 | "It this" should read --In this-- |
| 7 | 25 | after "another" insert --,-- |
| 7 | 26 | after "above" insert --,-- |
| 7 | 35 | "The parameter, sound above," should read --The above Sound parameter-- |
| 7 | 40 | after "example" insert --,-- |
| 8 | 4 | "a impulse" should read --an impulse-- |
| 8 | 25 | "convole" should read --convolve-- |

UNITED STATES PATENT AND TRADEMARK OFFICE
CERTIFICATE OF CORRECTION

PATENT NO. : 5,812,430
DATED : September 22, 1998
INVENTOR(S) : S.J. Altschuler et al.

It is certified that error appears in the above-indentified patent and that said Letters Patent is hereby corrected as shown below:

| COLUMN | LINE | |
|---|---|---|
| 8 | 31 | after "example" insert --,-- |
| 8 | 56 | "systems." should read --systems,-- |
| 9 | 7 | "result" should read --results-- |
| 9 | 11 | after "(sound))" insert a table break |
| 9 | 12 | "has the following properties" should appear in normal font size, after which a table break should begin |
| 9 | 15 | after "}" delete ";" |
| 9 | 23 | after "Specifying" delete "," |
| 9 | 23 | after "convenient" insert --,-- |
| 9 | 27 | "specifications. (The" should read --specifications (the-- |
| 9 | 28 | "FIG. 6)" should read --FIGURE 6).-- |
| 9 | 50 | "BAND= {0" should read --BAND+(0-- |
| 9 | 55 | after "that" insert --in-- |
| 9 | 59 | "appreciated to" should read --appreciated by-- |
| 9 | 61 | "compiler, however, could" should read --compiler; however, it could-- |

UNITED STATES PATENT AND TRADEMARK OFFICE
CERTIFICATE OF CORRECTION

PATENT NO. : 5,812,430
DATED : September 22, 1998
INVENTOR(S) : S.J. Altschuler et al.

It is certified that error appears in the above-indentified patent and that said Letters Patent is hereby corrected as shown below:

| COLUMN | LINE | |
|---|---|---|
| 10 | 37 | "filters;" should read --filter;-- |
| 12 (Claim 7, | 20 line 9) | "filter," should read --filters-- |
| 12 (Claim 9, | 61 line 2) | "timebased" should read --time-based-- |

Signed and Sealed this

Tenth Day of August, 1999

Attest:

Q. TODD DICKINSON

*Attesting Officer*            *Acting Commissioner of Patents and Trademarks*